June 4, 1963 R. C. TUCKER ETAL 3,092,015
BARBECUE GRILL
Filed March 6, 1962

INVENTORS

Roy C. Tucker
Opal L. Tucker

United States Patent Office 3,092,015
Patented June 4, 1963

3,092,015
BARBECUE GRILL
Roy C. Tucker and Opal L. Tucker, both of 110 E. Short, Independence, Mo.
Filed Mar. 6, 1962, Ser. No. 177,829
1 Claim. (Cl. 99—446)

This invention of ours relates to cooking utensils and more particularly to that one utensil usually associated with outdoor cooking, namely, the barbecue grill.

Many chefs, both amateur and professional, have often expressed a desire for a barbecue grill that will capture the true flavor and aroma of whatever is being barbecued.

Therefore, it is an object of this invention to provide a barbecue grill that will capture the true flavor and aroma of the meat or fish that is being barbecued and return it to the same for the full enjoyment of all concerned.

Another object of this invention is to provide a barbecue grill that will capture the true flavor and aroma of whatever is being cooked on the same without reverting to a complicated structure expensive to manufacture and purchase.

Another object of this invention is to provide a barbecue grill that will capture the true flavor and aroma of whatever is being cooked on the same by structure that we have designed which returns the heat and vapor from the food, by reason of it circulating through and around the trough and drip bars thus giving it, the food, the desired additional flavor.

Another object of this invention is to provide a barbecue grill that will cature the true flavor and aroma of whatever is being barbecued by structure that is easy to keep clean at all times, and with a minimum of effort.

Another object of this invention is to provide a barbecue grill that will capture the true flavor and aroma of whatever is being cooked on the same and at the same time be adaptable to existing structures for holding the grill over the coals or fire.

Still another object of this invention is to provide a barbecue grill that can be manufactured in any desired size and shape and still capture the true flavor and aroma of whatever is being barbecued.

Other and further objects of this new and unique barbecue grill that we have invented will be hereinafter described and the novel features thereof defined in the appended claims.

Referring to the drawings.

Figure 1:
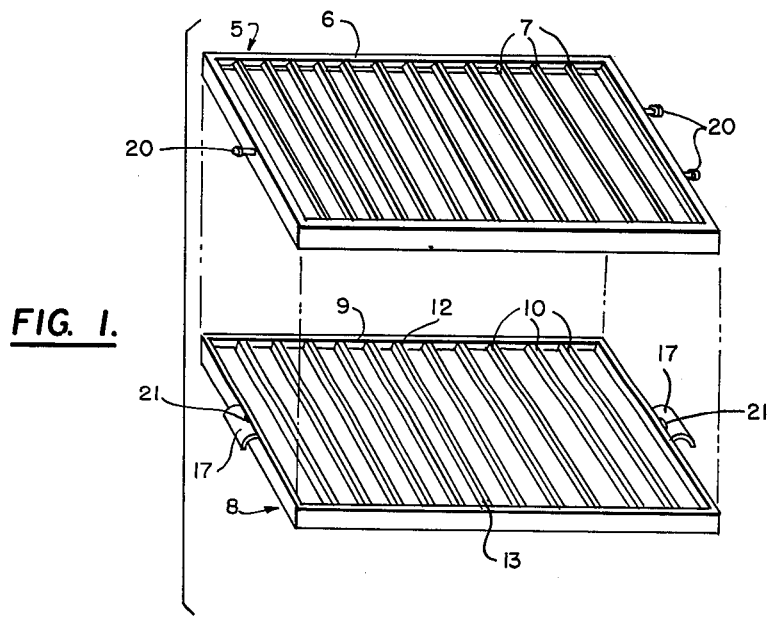
FIGURE 1 is a pictorial view of our invention, exploded to better show its construction.
Figure 2:
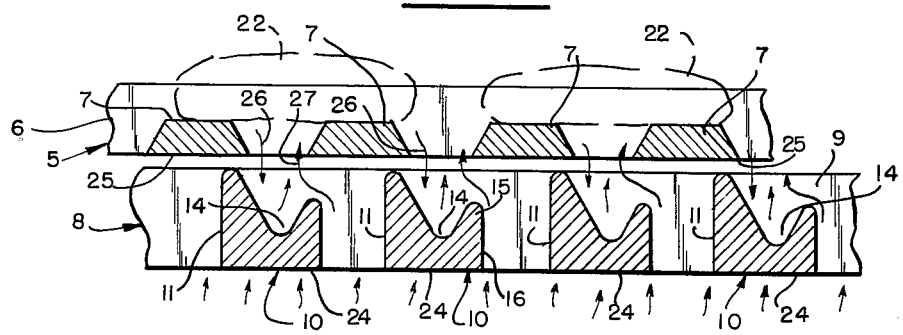
FIGURE 2 is a longitudinal sectional view of our invention showing the operation of the same.

Having reference now to the drawing in detail, our invention basically consists of two major parts, namely, an upper grill 5 embodying a frame 6 preferably rectangular in plane form and having a plurality of longitudinally spaced drip bars 7 that are trapezoidal in cross section as clearly shown in FIGURE 2 of the appended drawing, and a bottom grill 8 embodying a frame 9 of the same shape as the frame 6 of the upper grill 5. This frame 9 contains a plurality of longitudinally spaced trough bars 10. Each one of the bars 10 has one side 11 of a height equal to that of the frame 9 in and to which they are each secured at their ends 12 and 13 as one can see on examination of FIGURE 1 of the appended drawing. The bars 10 each have a V-shaped depression 14 therein as they are viewed in cross section (FIGURE 2). The aforesaid V-shaped depression 14 terminates in a rounded edge 15 and a side 16 that is approximately three-quarters that of the already mentioned side 11 to which it is obviously paralleled. Both the bottom of the V-shaped depression 14 and the upper edge of its high side (11) are also rounded for a purpose to hereinafter described.

Figure 3:
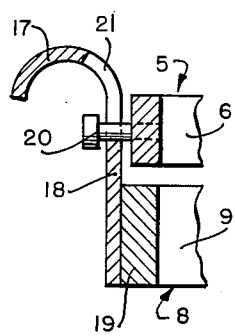
FIGURE 3 is a sectional view of that part of our invention which best shows the temporary connection of the upper and lower portion of the grill.

An inverted U-shaped hand lift 17 is secured to each end of the bottom grill 8. The hand lift 17 has one leg 18 secured to the end member 19 of the aforesaid frame 9 as one can see on examination of FIGURES 1 and 3 of the appended drawing. The leg 18 is of sufficient length as to extend above the ends of the top grill 5 and to receive a headed lock pin 20 in an opening 21 in the leg. The lock pin 20 having one end secured to the end of frame 6 of the already described upper grill 5 which is, of course, slightly smaller than the said bottom grill 8. The lift handle 17 and its attachment to, and twofold use in invention is, basically, the same at both ends of the barbecue grill, except that one end of the aforesaid frame 6 has two of the headed lock pins 20, while its opposite end only has one lock pin as clearly shown in FIGURE 1 of the appended drawing.

The construction of our invention which we suggest be made of cast aluminum, though it, of course, can be constructed of any suitable material and in any desired manner, stainless steel, spot welded is one optional material and method of manufacture to which this novel and useful barbecue grill readily adapts itself though many others may appear as new materials and methods of manufacture are developed.

The actual theory and method by which our invention functions and thus accomplishes many of its objects is best understood when one examines FIGURE 2 of the appended drawing which shows pieces of meat characterized by the reference numerals 22 on top of the drip bars 7 of the upper grill 5. The heat from the coals or fire over which the barbecue grill is placed is shown by the lines and arrows 23 to be coming upward between the trough bars 10 as well as against the bottom 24 of each one of the said trough bars. Some of the heat 23 is directly against the bottom 25 of the drip bars 7 since these said bars are located as to be located directly over the spaces between each one of the said trough bars 10 of our invention. From the above statements it will be understood that the juices from whatever is being barbecued will naturally drip down into the V-shaped depression 14 of each trough bar 10 over which whatever is being barbecued is placed. These drippings of juice is indicated by the lines downwardly pointed arrows 26. The juice in each said depression 14 is turned into vapor by the heat of the trough bars 10. The vapor will rise upward as indicated by the lines and arrows 27 and re-enter whatever is being barbecued, thus increasing its taste with its true flavor and aroma.

The fact that the meat or whatever else is to be barbecued is placed on the upper grill 5 is already thoroughly understood as is the method of locking the two grills 5 and 8 together has also been thoroughly explained in the construction of our invention of a barbecue grill.

From the foregoing it will now be seen that there is herein provided an improved barbecue grill which accomplishes all of the objects of our novel invention, and others, including many advantages of great practical utility and commercial importance.

As many embodments may be made of this inventive concept, and as many modifications may be made in the embodiment hereinbefore shown and described, it will be understood that all matter herein is to be interpreted merely as illustrative and not in a limiting sense.

What we claim for our invention is:

A barbecue grill of the character described, comprising a pair of rectangular grills nested one on top of the other, the top grill comprising a frame and a plurality of longitudinally spaced drip bars, each bar being trapezoidal in cross section, and the bottom grill comprising a frame and a plurality of longitudinally spaced trough bars, each one of the bars having one long side the same height as the said frame of which it is integrally formed, each one of said trough bars having a V-shaped depression therein, one side of the depression terminating in a rounded edge the same height as the said frame and the other side of the said depression terminating in a rounded upper edge of the side that is approximately three-quarters as high as that of the first mentioned side of the same trough bar to which it is parallel, the trough bars in the said bottom grill being so located that when the said top grill is placed thereon the drip bars of the said top grill will be over each space that is between each one of the trough bars in the said bottom grill, and a mechanism at each end of the said barbecue grill temporarily securing the said top grill to the said bottom grill, each mechanism embodying an inverted U-shaped hand lift having a long leg secured to the end of the frame of the said bottom grill, at least one headed lock pin secured to each end of the frame, each of said legs having at least one opening therein in vertical alignment with, and each receiving its aligned pins, the said headed lock pin projecting outward as to permit insertion in the opening in the long leg of the said inverted U-shaped hand lift when the said top grill is placed on the said bottom grill, the insertion of the said locking pin of the said top grill in the opening in the said long leg of the said inverted U-shaped hand lift being possible by reason of a difference in size of the two grills.

References Cited in the file of this patent
UNITED STATES PATENTS

| | | |
|---|---|---|
| 3,973 | Hawkins | Mar. 26, 1845 |
| 318,493 | Newell | May 26, 1885 |
| 347,822 | Newell | Aug. 24, 1886 |
| 2,940,381 | Cottongim et al. | June 14, 1960 |